June 17, 1969 G. K. STREHL 3,451,048

DRIVE SYSTEM FOR A MAGNETIC CORE ARRAY

Filed Oct. 5, 1965

Sheet 1 of 3

INVENTOR
GERALD K. STREHL

BY John C Black

ATTORNEY

June 17, 1969 G. K. STREHL 3,451,048

DRIVE SYSTEM FOR A MAGNETIC CORE ARRAY

Filed Oct. 5, 1965 Sheet 2 of 3

3,451,048

DRIVE SYSTEM FOR A MAGNETIC CORE ARRAY

Gerald K. Strehl, Pontiac, Mich., assignor to International Business Machines Corporation, Armonk, N.Y., a corporation of New York Filed Oct. 5, 1965, Ser. No. 493,112
Int. Cl. G11b 21/02
U.S. Cl. 340—174 7 Claims

ABSTRACT OF THE DISCLOSURE

In a direct drive core storage system, secondary windings of read and write pulse transformers are connected between the drive lines and their conventional direct current power supply terminals. Square wave voltage pulses produced in the secondary windings are superimposed upon the power supply to produce rapid drive current rise times and reduced noise problems. Floating, nonsaturating transistor switches with base overdrive during turn-on coact with the power supply-transformer to provide optimum speed and reliability.

Figure 1:
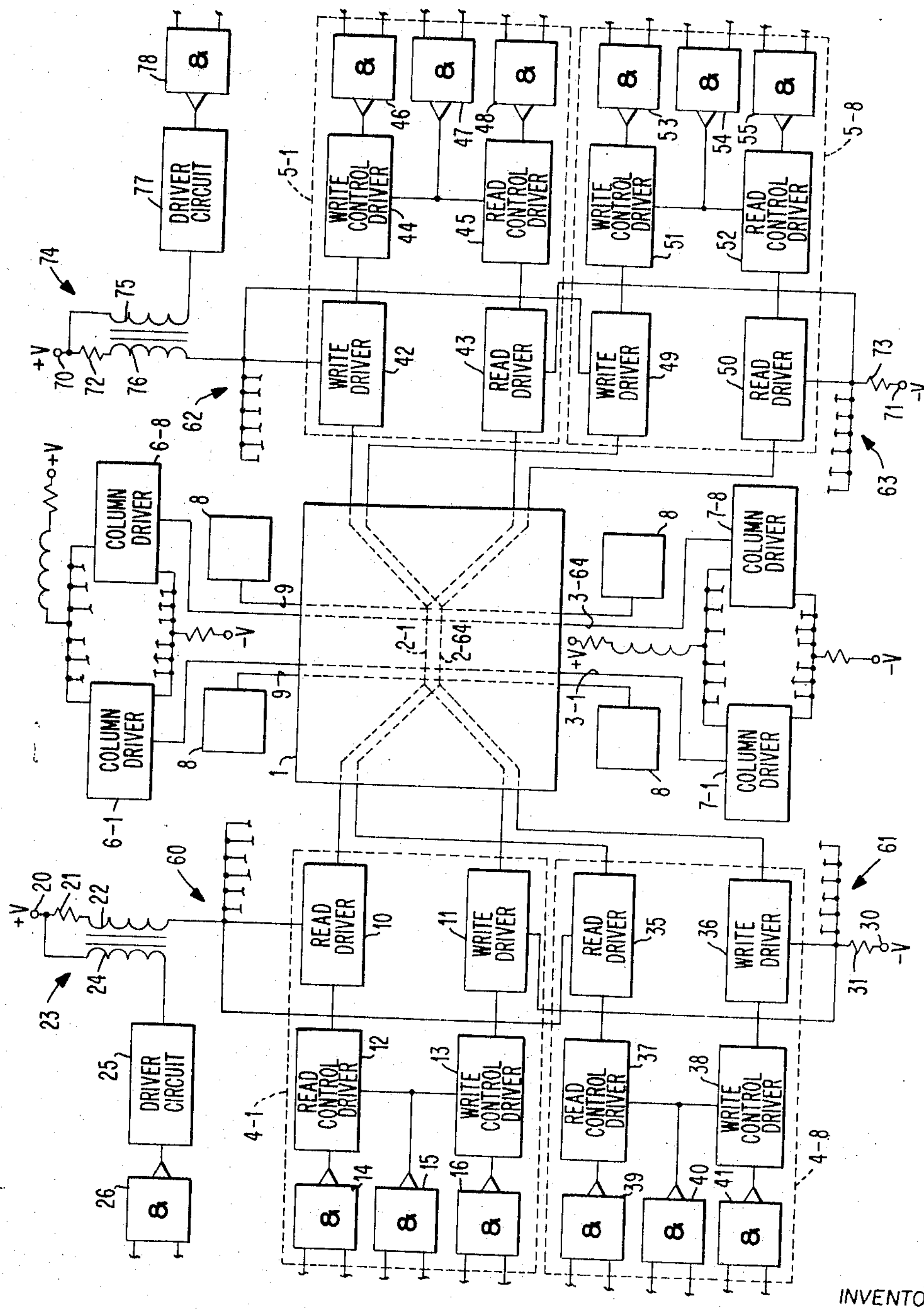

This application relates generally to an improved drive system for a magnetic core array.

In the past, many different core array drive schemes have been proposed; one of which is frequently referred to as a "direct drive" system. One form of the direct drive type system is illustrated in United States Patent No. 3,192,510, issued June 29, 1965, to R. J. Flaherty, entitled, "Gated Diode Selection Drive System."

In a typical array, cores which exhibit a square loop hysteresis characteristic are arranged in rows and columns; and drive means associated therewith address selected groups of cores in the array. Each row and each column of cores has a drive line to which bipolar read and write currents are applied. A source of read and write current is selectively connected to the drive lines by way of switches to set the cores to one or the other of two stable states upon the coincident read or write energization of row and column drive lines common to the cores.

In data processing apparatus using magnetic cores as storage, transistors are typically used as switches for selectively applying the energizing currents to the drive lines. In the interest of economy, the number of transistor switches is minimized by providing a transistor-diode selection matrix to control the selection of drive lines.

In one typical system, the transistor switches are arranged in pairs referred to as drivers. Half of the driver pairs are connected to the row drive lines and half to the column drive lines. Each pair of drivers is connected to one or the other end of a drive line by means of two sets of oppositely poled isolating diodes. One driver from each of two pairs is turned on to apply read current to a respective drive line, and the other drivers of the pairs apply write current to the line. In this manner, the number of transistors which is required for any given size storage device is reduced to a minimum.

This "direct drive" system has been found to be one of the most economical designs for the main storage sections of data processing apparatus. In the typical main storage, inhibit drive lines are used in conjunction with the row and column drive lines described above for selective energization of each core in a predetermined group of cores associated with a pair of row and column drive lines during the write cycle.

In such direct drive systems, the power supply has, so far as is known, been in the form of one or more direct current power supplies. A particularly troublesome problem has been encountered in systems of this type; that is, the rise times of the drive current pulses have been typically slower than is desirable, whereby the operating speed of the array is limited. At least a part of the slow rise time problem encountered in the direct drive memory is due to the fact that the sense lines which receive output signals from the cores are coupled to the same power supplies as the drive circuits and part of the drive power is coupled into these sense lines. The core array also has a significant stray capacitance which is charged by the drive lines, thus slowing the rise times of the current.

The inductive, but more especially the capacitive, coupling of a part of the drive current into the sense lines, which are not isolated from the power supplies, also gives rise to troublesome noise problems. Attempts have been made to "balance" the array to minimize the noise problems, but this alone is not completely satisfactory.

Accordingly, it is a primary object of the present invention to provide an improved direct drive system for a high speed memory.

This object is provided in a preferred embodiment of the present invention by including the secondary winding of a pulse transformer in the series circuit for each drive line. Preferably, a first read transformer and a first write transformer are provided for the row drive lines. Second read and write transformers are provided for the column drive lines. These transformers are controlled in such a manner that, as pairs of driver transistors are turned on to energize selected row and column drive lines, a square wave voltage pulse is produced in each secondary winding and is superimposed upon the potential level of the direct current supply to produce a very rapid rise time in the drive current. This pulse is of short time duration and is removed as the drive current approaches the maximum current level which is desired. With this arrangement, the memory can be operated at substantially higher speed levels.

In addition, the fast rise and fall times minimize noise problems in the sense lines and improve the reliability of the array.

Accordingly, it is a more specific object of the present invention to provide an improved direct drive system for a core array which is characterized by means for superimposing upon the direct current power supplies for the drive lines a voltage pulse of short duration for substantially decreasing the time required for the drive line current to reach its maximum selected value.

In the preferred embodiment of the present invention, each of the transistor drivers is in the form of a floating, nonsaturating switch of the type described and claimed in United States patent application of Edward H. Sommerfield, Ser. No. 269,370, filed Apr. 1, 1963, now Patent No. 3,289,008, issued Nov. 29, 1966, and assigned to the assignee of the present application. Said application is hereby incorporated herein by reference as if it were set forth in its entirety.

Briefly, this driver includes a transistor having a transformer as the sole source of energizing current for the base-emitter circuit. The transformer includes a primary winding, a secondary winding connected across the base-emitter electrodes, and an additional secondary winding connected across the emitter-collector electrodes. A diode is connected in series with said additional winding.

During turn-on of the transistor, the diode becomes forward biased as the transistor approaches saturation to maintain the voltage of said additional winding across the emitter-collector electrodes, inhibiting operation in the region of saturation. When the diode forward biases, the base current falls to a level which is a small fraction of its initial turn-on level.

This switch therefore provides rapid turn-on with an initial base current overdrive. It also is especially advantageous because its emitter electrode is "floating"; and turn-on of the transistor is assured irrespective of the voltage level at the emitter electrode.

Accordingly, it is another important object of the present invention to provide an improved direct drive system for a core memory characterized by floating, nonsaturating transistor switches associated with the drive lines and selectively energized for completing series drive circuits including a source of direct current and a source of pulses of short duration superimposed upon the direct current source to decrease the rise time of the drive current.

The foregoing and other objects, features and advantages of the invention will be apparent from the following more particular description of a preferred embodiment of the invention, as illustrated in the accompanying drawings.

Figure 3:
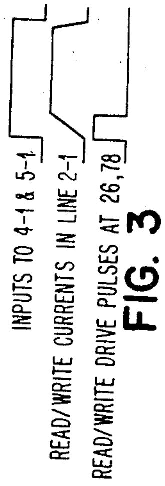
Figure 2A:
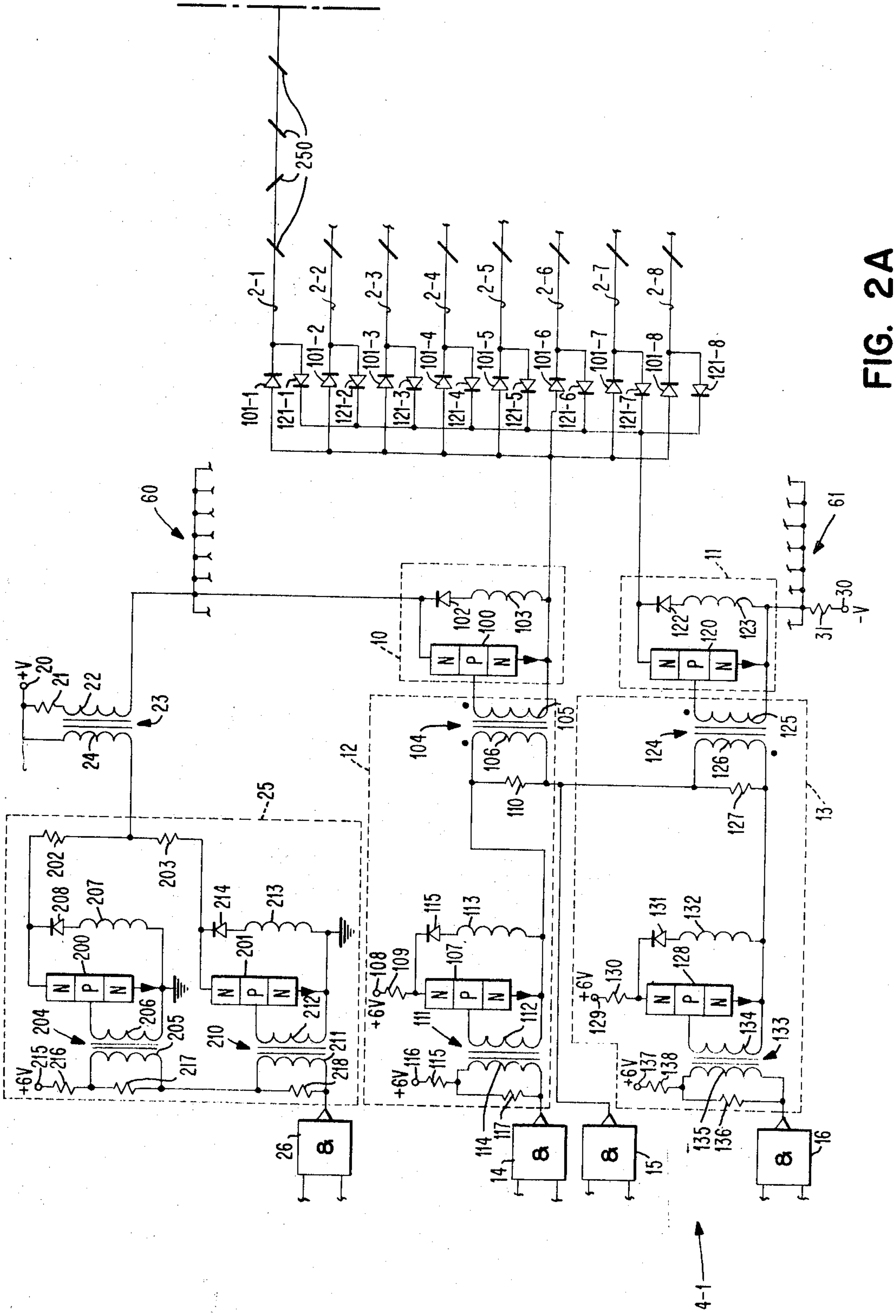
Figure 2B:
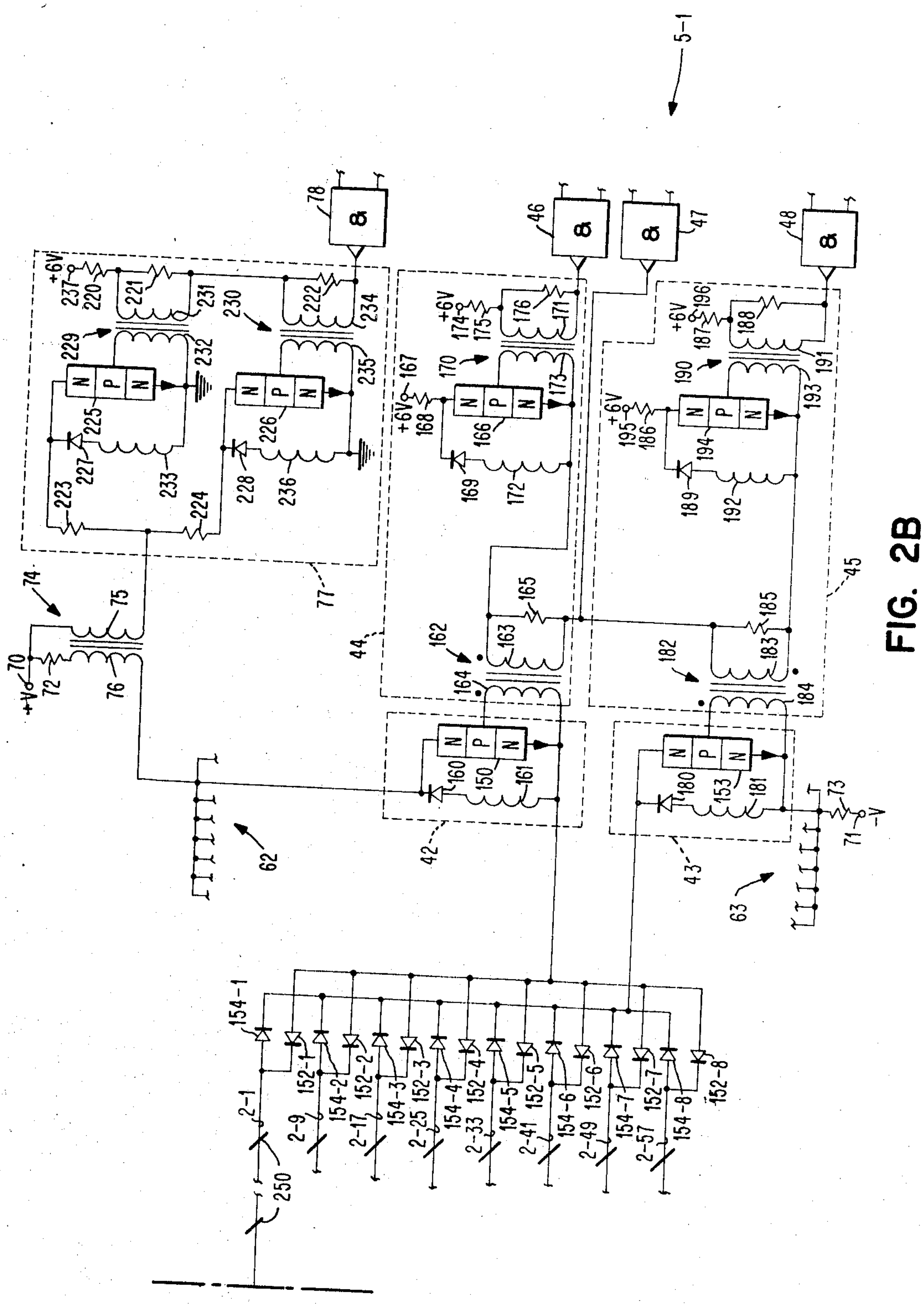

In the drawings:

FIG. 1 is a fragmentary view which illustrates the improved direct drive system diagrammatically;

FIGS. 2*a* and 2*b* are a fragmentary, schematic diagram illustrating the details of the preferred embodiment of the present invention; and FIG. 3 shows waveforms which more clearly illustrate the preferred method of operating the preferred embodiment.

It will be appreciated that the improved drive system can be used in core arrays which are arranged in either 2-dimensional or 3-dimensional form. The present detailed description will be limited to the 3-dimensional form.

In the diagrammatic embodiment set forth in FIG. 1, it is assumed that a core array 1 includes a sixty-four row drive lines 2–1 to 2–64 and sixty-four column drive lines 3–1 to 3–64 to provide four thousand ninety-six addressable positions of storage. A first set of row drive circuits 4–1 to 4–8 is coupled to the left-hand terminals of the row drive lines and a second group of eight row drive circuits 5–1 to 5–8 is connected to the right-hand terminals of the row drive lines.

A first set of column drive circuits 6–1 to 6–8 is connected to the upper terminals of the column drive lines and a second set of column drive circuits 7–1 to 7–8 is connected to the lower terminals of the column drive lines. Each drive circuit is coupled to a respective eight of the associated drive lines, and the selection of one drive circuit 4–1 to 4–8 and one drive circuit 5–1 to 5–8 will select one row line 2–1 to 2–64. Similarly, the selection of one drive circuit of each group 6–1 to 6–8 and 7–1 to 7–8 will select one column line 3–1 to 3–64.

Thus the selection of one each of the drivers 4–1 to 4–8, 5–1 to 5–8, 6–1 to 6–8 and 7–1 to 7–8 will result in the addressing of a particular one of the four thousand ninety-six positions in the array. This addressed position in the array will typically include a plurality of cores equal in number to the number of bits of binary data which it is desired to store in said position. During a WRITE cycle, inhibit drivers 8 and inhibit lines 9, each associated with a respective bit position, are selectively controlled to determine whether a binary one or a binary zero is entered into the bit position. A sense line is associated with each bit position for removing the binary value stored in the bit position during a READ cycle. In some instances, the same line (e.g., 9) is used as both an inhibit line and a sense line.

Each of the row and column drive circuits is preferably identical in construction. The inhibit drive circuits may be of conventional design.

The drive circuit 4–1 includes a read driver 10, a write driver 11, read and write control drivers 12 and 13 and logical AND circuits 14, 15 and 16. The read driver 10 is coupled to a positive supply terminal 20 by way of a resistor 21 and the secondary winding 22 of a transformer 23. The transformer 23 includes a primary winding 24 connected to the supply terminal 20 and to a drive circuit 25. The drive circuit is in turn controlled by a logical AND circuit 26.

The write driver 11 is connected to a negative supply terminal 30 by way of a resistor 31. Preferably, the supply terminals 20 and 30 have applied thereto potentials equal in magnitude but opposite in polarity.

Each of the row and column drive circuits is similarly constructed in the preferred embodiment. Thus the drive circuit 4–8 includes read and write drivers 35 and 36, read and write control drivers 37 and 38 and logical AND circuits 39, 40 and 41.

The driver circuit 5–1 includes write and read drivers 42 and 43, write and read control drivers 44 and 45 and logical AND circuits 46, 47 and 48.

The drive circuit 5–8 includes write and read drivers 49 and 50, write and read control drivers 51 and 52 and logical AND circuits 53, 54 and 55.

The transformer secondary winding 22 is connected to the read drivers of the circuits 4–1 to 4–8 by way of conductors 60.

The resistor 31 is connected to the write drivers of the circuits 4–1 to 4–8 by way of the conductors 61.

The arrangement of the power supplies for the drive circuits 5–1 to 5–8 is similar to that described for the drivers 4–1 to 4–8. This supply includes positive and negative terminals 70 and 71, resistors 72 and 73 and a transformer 74 including a primary winding 75 and a secondary winding 76. The secondary winding 76 is connected to each of the write drivers of the circuits 5–1 to 5–8 by way of conductors 62 and the resistor 73 is connected to each of the read drivers of circuits 5–1 to 5–8 by way of conductors 63. The primary winding 75 is connected to a drive circuit 77 which is in turn controlled by a logical AND circuit 78.

The drive system for the column drive lines is preferably identical to that described above with respect to the row drive lines and will not be further described.

FIGS. 2*a* and 2*b* show the row drive circuits 4–1 and 5–1 in more detail in order to more fully explain the operation of a preferred embodiment of the improved drive system. Corresponding elements and circuits in FIGS. 1, 2*a* and 2*b* have been assigned the same reference numerals.

The read driver 10 (FIG. 2*a*) includes a transistor 100 having its collector electrode coupled to the secondary winding 22 and its emitter electrode coupled to the drive lines 2–1 to 2–8, inclusive, by way of diodes 101–1 to 101–8, inclusive. The read driver also includes a diode 102 and the secondary winding 103 of a transformer 104. The transformer also includes a secondary winding 105 connected across the base-emitter electrodes of the transistor 100.

The read control circuit 12 includes the primary winding 106 of the transformer 104 and a transistor amplifier 107. The amplifier includes a collector electrode connected to a positive supply terminal 108 by way of a resistor 109 and an emitter electrode connected to the primary winding 106 and to a shunt resistor 110. The logical AND circuit 15 is connected to the primary winding 106 and to its shunt resistor 110.

An energizing circuit for the amplifier 107 includes a transformer 111 having first and second secondary windings 112 and 113 and a primary winding 114. The secondary winding 112 is connected across the base-emitter electrodes of the amplifier 107, and the secondary winding 113 is connected in series with a diode 115 across the emitter-collector electrodes. The primary winding 114 is connected to the logical AND circuit 14 and to a positive supply terminal 116 by way of a resistor 115. A resistor 117 is connected in parallel with the primary winding 114 of the transformer 111.

The write driver 11 is similar to the read driver 10 and includes a transistor 120 having its emitter electrode connected to the negative supply terminal 30 and its collector electrode connected to the drive lines 2–1 to 2–8 by way of diodes 121–1 to 121–8, inclusive.

A diode 122 and the secondary winding 123 of a transformer 124 are connected across the emitter-collector electrodes of the transistor 120. The transformer 124 includes another secondary winding 125 connected across the base-emitter electrodes of the transistor 120. The primary winding 126 of the transformer 124 and a shunt resistor 127 are connected between the logical AND circuit 15 and the emitter electrode of a transistor amplifier 128.

The collector electrode of the transistor 128 is connected to a positive supply terminal 129 by way of a resistor 130. A diode 131 and the secondary winding 132 of a transformer 133 are connected across the emitter-collector electrodes of the transistor 128. Another secondary winding 134 of the transformer 133 is connected across the base-emitter electrodes of the transistor 128. The primary winding 135 of the transformer 133 and a shunt resistor 136 are connected between the logical AND circuit 16 and a positive supply terminal 137 by means of a resistor 138.

The circuits 42, 43, 44 and 45 are similar to the circuits 10, 11, 12 and 13, respectively. Thus the write driver 42 includes a transistor 150 having its emitter electrode connected to a plurality of drive lines 2–1, 2–9, 2–17, 2–25, 2–33, 2–41, 2–49 and 2–57, inclusive, by way of diodes 152–1 to 152–8, inclusive. These same lines are also connected to the collector electrode of a transistor 153 of the read driver 43 by way of diodes 154–1 to 154–8, inclusive.

In this regard, it will be noted that the lines 2–9, 2–17, etc., are each connected to the read and write drivers of a respective one of the circuits 4–2 to 4–8 (FIG. 1). Similarly, the lines 2–2 to 2–8, inclusive, are each connected to the read and write drivers of a respective one of the circuits 5–2 to 5–8 (FIG. 1).

The driver 42 also includes a diode 160 and the secondary winding 161 of a transformer 162. The transformer 162 includes a primary winding 163 and an additional secondary winding 164.

The control circuit 44 includes the transformer 162, a resistor 165, a transistor amplifier 166, a positive supply terminal 167, a resistor 168, a diode 169, a transformer 170 including a primary winding 171 and secondary windings 172 and 173, a supply terminal 174 and resistors 175 and 176.

The driver 43 also includes a diode 180 and the secondary winding 181 of a transformer 182. The control circuit 45 includes the primary winding 183 of the transformer 182 and an additional secondary winding 184, resistors 185, 186, 187 and 188, a diode 189, a transformer 190 with a primary winding 191 and secondary windings 192 and 193, a transistor amplifier 194 and power supply terminals 195 and 196.

The drive circuit 25 of the primary winding 24 of the pulse transformer 23 includes a pair of transistors 200 and 201 having their emitter electrodes connected to ground potential and their collector electrodes connected to the winding 24 by way of resistors 202 and 203. A transformer 204 includes a primary winding 205, a secondary winding 206 connected across the base-emitter electrodes of the transistor 200 and an additional secondary winding 207 connected in series with the diode 208 across the emitter-collector electrodes of the transistor 200. A transformer 210 includes a primary winding 211, a secondary winding 212 connected across the base-emitter electrodes of the transistor 201 and an additional secondary winding 213 connected in series with a diode 214 across the emitter-collector electrodes of the transistor 201. The logical AND circuit 26 is connected to a positive supply terminal 215 by way of a resistor 216, the primary winding 205 and its shunt resistor 217, and the primary winding 211 and its shunt resistor 218.

The drive circuit 77 for the primary winding of the pulse transformer 74 is similar to the drive circuit 25 and includes resistors 220, 221, 222, 223 and 224, transistors 225 and 226, diodes 227 and 228, and transformers 229 and 230 and a positive supply terminal 237. The transformer 229 includes a primary winding 231 and secondary windings 232 and 233. The transformer 230 includes a primary winding 234 and secondary windings 235 and 236.

The operation of the circuits of FIGS. 2*a* and 2*b* for the energization of the drive line 2–1 will now be described in detail. During the WRITE cycle, the logic addressing circuits (not shown) energize the logical AND circuits 15 and 16 of the drive circuit 4–1 and the logical AND circuits 46 and 47 associated with the drive circuit 5–1.

The energization of the logical AND circuit 16 applies ground potential to the lower terminal of the primary winding 135 to produce a pulse in the secondary winding 134. This pulse turns the transistor 128 on. When the logical AND circuit 15 is energized, it applies ground potential to the upper terminal of the primary winding 126. Thus an energizing circuit for the primary winding is completed by way of the circuit 15, primary winding 126, the transistor 128, the resistor 130 and the positive supply terminal 129. Energization of the primary winding 126 produces a pulse in the secondary winding 125 which turns on the transistor 120.

The diodes 131 and 122 and the secondary windings 132 and 123 cause the transistors 128 and 120 to operate in a region close to, but slightly out of, saturation. For a more detailed description of the operation of the transistors 128 and 120 and their associated transformers 133 and 134, reference may be had to the above-mentioned application of Edward H. Sommerfield. What is of importance is the fact that the transistor 120 will be turned on with an initial base overdrive current for fast turn-on and can be turned off rapidly because it is maintained out of saturation.

When the logical AND circuit 46 is energized, it applies ground potential to the lower terminal of the primary winding 171 to produce a pulse therein. This results in a pulse being produced in the secondary winding 173 for turning on the transistor 166. With the transistor 166 turned on, energization of the logical AND circuit 47 causes an energizing circuit to be completed for the primary winding 163 of the transformer 162 by way of the circuit 47, the primary winding 163, the transistor 166, the resistor 168 and the positive supply terminal 167. Energization of the primary winding 163 produces a pulse in the secondary winding 164 for turning on the transistor 150.

With the transistors 120 and 150 turned on as described above, a circuit is completed for initiating write current in the drive line 2–1 over a path extending from the negative supply terminal 30, resistor 31, transistor 120, diode 121–1, line 2–1, diode 152–1, transistor 150, secondary winding 76 and resistor 72 to the positive supply terminal 70.

When the logical AND circuits 15, 16, 46 and 47 are energized, the logical AND circuit 78 is also energized to initiate the operation of the drive circuit 77. Energization of the logical AND circuit 78 applies ground potential to the lower terminal of the primary winding 234, completing an energizing circuit for both primary windings 234 and 231. When these primary windings are energized, they produce pulses in the secondary windings 235 and 232 for turning on the transistors 226 and 225. When the transistors 225 and 226 turn on, they apply ground potential to the primary winding 75 of the transformer 74 to produce an essentially square wave voltage pulse in the secondary winding 76, which voltage adds to the potential at the supply terminal 70 to decrease the rise time of the write current through the line 2–1. The timing of the input waveforms and the write current is illustrated in FIG. 3.

In a similar manner, the read drivers 10 and 43 will be energized during the READ cycle to produce a read current in the line 2–1 which is opposite in polarity to the write current. The read current will flow through a path extending from the positive supply terminal 20, resistor 21, secondary winding 22, transistor 100, diode 101–1, line 2–1, diode 154–1, transistor 153 and resistor 73 to the negative supply terminal 71. At the same time, the primary winding 24 of the pulse transformer 23 will be energized to produce a square wave voltage pulse in the secondary winding 22 to decrease the rise time of the read current.

During the WRITE cycle, the write current in the line 2–1, the write current in a selected column drive line 3–1 to 3–64 and the absence of inhibit currents in selected ones of the inhibit drive lines 9 will cause the switching of certain of the bistable cores 250 through which the drive line 2–1 and the other selected lines are threaded. These cores are switched to their opposite stable states which are representative of logical "1" data bits.

During a READ cycle, the read current in the selected row and column drive lines will cause the switched cores to be reset to their initial states. In switching back to their initial states, the cores will produce in their respective sense lines, output pulses representative of a logical "1" data bit. The same lines can be used, if desired, for both inhibit and sense functions.

The improved transistor gates, such as 100, 120, 150 and 153, by reason of their rapid turn-on and turn-off times, and the transformers 23 and 74, by reason of their effective increase in the applied voltage at the beginning of each READ and WRITE cycle, significantly improve the speed at which the core array can be operated. In addition, the improved rise and fall times significantly improve the reliability of the array, particularly in the amplifier circuits associated with the sense lines, which amplifiers are adversely affected by the rise and fall times.

It will be apparent that various modifications may be made by those skilled in the art without the exercise of invention and without departing from the spirit and scope of the present invention. For example, pulse transformers similar to 23 and 74 can be incorporated at the opposite ends of the drive lines between the resistors 31 and 73 and their corresponding conductors 61 and 63, whereby the short duration pulses may be produced at both ends of the line to further improve the rise and fall times of the read and write currents.

Direct current coupled inputs can be provided for the driver transistors such as 100, 120, 150 and 153; however, this does not provide the emitter isolation afforded by the present drivers. Note that the emitters of the transistors 100, 120, 150 and 153 are floating; that is, the voltage level at the emitters may change signaficantly during a cycle of operation as a result of the inductive loads which are being driven, yet turn-on of the transistors is guaranteed irrespective of the emitter voltage because of the input transformer coupling. This is particularly advantageous in core array drive systems. It has also been found that this transformer coupling in its transistor drivers reduces the amount of noise which is coupled from the drive system into the sense lines and, therefore, improves the over-all operation of the array.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a magnetic core array of the type:

in which a plurality of bistable cores is arranged in a plurality of spaced planes, the cores in each plane being further arranged in rows and columns;

in which row and column drive lines, threaded through respective rows and columns of cores, and means including at least one additional line, threaded through the cores of each plane, selectively address the cores; and in which means including a direct current power supply and electronic switch means selectively connecting the drive lines to the power supply are operated for selectively applying bipolar read and write currents to the drive lines for entering binary data into and reading binary data from the cores;

the combination with the power supply means of:

a first pair of read and write pulse transformers, each including a secondary winding connected in series with the direct current power supply, the operated electronic switch means and the selected row drive lines and producing a voltage pulse of the same polarity as the power supply upon the initiation of its corresponding read or write current for decreasing the rise time of said current; and a second pair of read and write pulse transformers, each having a secondary winding connected in series with the direct current power supply, the operated electronic switch means and the selected column drive lines and producing a voltage pulse upon the initiation of its corresponding read or write current for decreasing the rise time of said current.

2. The combination set forth in claim 1 wherein the electronic switch means includes a plurality of transistor gates connected to respective drive lines, each gate comprising:

a transistor switch including base and emitter electrodes; and an input transformer including a secondary winding connected across the base and emitter electrodes and providing the sole source of base-emitter energizing current; and wherein the read and write pulse transformers terminate their voltage pulses when the respective read or write current approaches a desired level.

3. The combination set forth in claim 1 wherein the electronic switch means includes a plurality of transistor gates connected to respective drive lines, each gate comprising:

a transistor switch including base, collector and emitter electrodes;

an input transformer including a secondary winding, connected across the base and emitter electrodes and providing the sole source of base-emitter energizing current, and including an additional secondary winding;

a diode and said additional winding being connected in series across the emitter and collector electrodes and effective to prevent operation of the transistor switch in saturation.

4. In a magnetic core array of the type:

in which a plurailty of bistable cores is arranged in rows and columns;

in which means including row and column drive lines are threaded through respective rows and columns of cores for the selective addressing thereof; and in which means including a power supply and electronic switch means selectively connecting the drive lines to the power supply are operated for selectively applying bipolar read and write currents through the switch means to the drive lines for entering binary data into and reading binary data from the cores;

the combination with the power supply of:

means for producing a pulse of the same polarity as and superimposed upon the power supply upon the initiation of read and write currents for decreasing the rise times of said currents.

5. The combination set forth in claim 4 wherein the electronic switch means includes a plurality of transistor gates connected to respective drive lines, each gate comprising:

a transistor switch including base and emitter electrodes; and an input transformer including a secondary winding connected across the base and emitter electrodes and providing the sole source of base-emitter energizing current.

6. The combination set forth in claim 4 wherein the electronic switch means includes a plurality of transistor gates connected to respective drive lines, each gate comprising:

a transistor switch including base, collector and emitter electrodes;

an input transformer including a secondary winding, connected across the base and emitter electrodes and providing the sole source of base-emitter energizing current, and including an additional secondary winding;

a diode and said additional winding being connected in series across the emitter and collector electrodes and effective to prevent operation of the transistor switch in saturation.

7. The combination set forth in claim 4 wherein said pulse producing means comprises:

a first pair of read and write pulse transformers, each including a secondary winding connected in series with the power supply, the operated electronic switch means and the selected row drive lines and producing a pulse upon the initiation of its corresponding read or write current for decreasing the rise time of said current; and a second pair of read and write pulse transformers, each having a secondary winding connected in series with the power supply, the operated electronic switch means and the selected column drive lines and producing a pulse upon the initiation of its corresponding read or write current for decreasing the rise time of said current.

References Cited

UNITED STATES PATENTS

| | | | |
|---|---|---|---|
| 3,343,147 | 9/1967 | Ashwell | 340—174 |
| 3,289,008 | 11/1966 | Sommerfield | 307—218 |

BERNARD KONICK, *Primary Examiner.*

G. M. HOFFMAN, *Assistant Examiner.*

U.S. Cl. X.R.

307—253, 270